United States Patent
Pettigrew et al.

[11] Patent Number: 5,733,421
[45] Date of Patent: Mar. 31, 1998

[54] HYDROGEN-OXYGEN FUEL CELL

[76] Inventors: J. W. Pettigrew; Gregory R. Monette; David H. Hirsch, all of 3705 Arctic Blvd. #498, Anchorage, Ak. 99507

[21] Appl. No.: 715,583

[22] Filed: Sep. 19, 1996

[51] Int. Cl.$^6$ .................... C25B 9/00; C25B 15/08
[52] U.S. Cl. .................. 204/228; 204/229; 204/270; 204/268
[58] Field of Search ................ 204/228, 270, 204/229, 230, 268

[56] References Cited

U.S. PATENT DOCUMENTS

| | | | |
|---|---|---|---|
| 3,957,618 | 5/1976 | Spirig | 204/270 |
| 4,014,777 | 3/1977 | Brown | 204/270 |
| 4,379,043 | 4/1983 | Chappelle | 204/229 |
| 4,457,816 | 7/1984 | Galluzzo et al. | 204/270 X |
| 4,726,888 | 2/1988 | McCambridge | 204/270 X |
| 5,082,544 | 1/1992 | Willey et al. | 204/270 |
| 5,231,954 | 8/1993 | Stowe . | |
| 5,628,885 | 5/1997 | Lin | 204/270 X |

OTHER PUBLICATIONS

Dahiya, Progress in Hydrogen Energy, D. Reidel Publishing Co., (1987), pp. 15–29 (month N/A).
Graham & Trotman, Hydrogen Energy Vector of the Future, (Mar. 24–25, 1981), pp. 55–67.
Casper, Hydrogen Manufacture by Electrolysis, Thermal Decomposition and Unusual Techniques, Noyes Data Copr (1978) pp. 111–207 (month N/A).

*Primary Examiner*—Donald R. Valentine
*Attorney, Agent, or Firm*—Michael J. Tavella

[57] ABSTRACT

A hydrogen-oxygen fuel cell that uses an electrolysis unit that is sealed and has protection from explosions and corrosion. It has a plate structure that produces maximum efficiency of hydrogen production and can adjust the output to better match the needs of a given engine. The unit has an automatic fill system to keep the electrolyte solution at the proper levels for efficient hydrogen production, and the temperature of the electrolysis chamber remains low, thereby reducing the problems of cooling the chamber and the risk of melting the chamber. The device has an extraction chamber that is baffled to prevent backwash of electrolyte solution out of the electrolyte chamber. The device has an explosion preventer that reduces the explosion risk by working the produced gasses through a neutral fluid.

24 Claims, 6 Drawing Sheets

HYDROGEN-OXYGEN FUEL CELL

This invention relates to hydrogen-oxygen fuel cells and particularly to hydrogen-oxygen fuel cells in a closed chamber for use in vehicles.

BACKGROUND OF THE INVENTION

There are two major problems in the operation of fossil fueled vehicles that have existed for some time. The first is the apparently limited supply of fossil fuels. The second is the pollution that these vehicles produce. Even if the supply of fossil fuels expands, it is still good policy to conserve as much as practical. One of the key concerns of conservation is the cost of the particular measure. So, the ideal conservation measure is one that produces significant reductions in fuel use at the lowest possible cost.

The second problem centers on the emissions produced when burning fossil fuels. Vehicles burning such fuels often produce carbon monoxide, nitrous oxides, sulfur dioxide and other noxious gasses. These products are a result, in part, of engines not completely burning the fuel.

It has long been known that hydrogen is a near perfect fuel. It releases almost three times the energy of fossil fuels when burned, it produces only water as the product of combustion, and it can be readily produced from water by electrolysis. Despite these advantages, hydrogen has one serious drawback-it is highly explosive. Thus, it has not proved practical to operate vehicles using pure hydrogen as a fuel source. Moreover, although it can be readily produced from water, it takes energy to produce the hydrogen, which typically is produced from fossil fuel sources.

Despite these drawbacks, considerable research has been done on the effects of mixing hydrogen with gasoline in motor vehicles. We know that mixing hydrogen with gasoline and air in the combustion chamber of a conventional engine produces improved thermal efficiency and a reduction in emissions of pollutants. Although these tests have proved successful, the problem remains that producing and maintaining a supply of hydrogen in the engine compartment has many safety and operating problems. In the past, heavy duty canisters, ventilation systems, plumbing and circuitry were used to attempt hydrogen generation. Moreover, a system had to be developed to prevent explosive concentrations of hydrogen from accumulating in the engine compartment.

One attempt at a solution is found in U.S. Pat. No. 5,231,954 to Stowe. The Stowe design consists of a cylindrical plastic tube that is sealed on the bottom. Two electrode plates are placed in the tube and the plates are covered with a water-electrolyte mixture. A pair of terminals is attached to the side of the cylinder. Wires from the vehicle's battery attach to the terminals. When electrical power is connected to the plates, electrolysis occurs in the cylinder. The hydrogen-oxygen gas mixture rises to the top of the chamber in an accumulation zone. A line to the positive crankcase ventilation (PCV) system provides a vacuum source in the accumulation zone that removes the generated gasses quickly and places them into the fuel delivery system for the engine. As a key safety factor, the Stowe device has a friction-fit cap that maintains its position under ordinary operating conditions, but is designed to "pop off" if operating pressures are exceeded.

Despite the reduction in weight and other improvements in the Stowe design, it is still lacking in many respects. First, there is no way to adjust the production levels of hydrogen to optimize the production to a particular engine. As a result, some smaller engines may receive an excess amount of hydrogen while some larger engines may not receive enough. Second, the use of two plates does not produce the optimum efficiency of hydrogen production. The process takes some time to begin. And because of the spacing between the plates, the reaction can generate a considerable amount of heat. As the level of electrolyte drops within the chamber, the temperature increases, gas production decreases and steaming may occur. Because there is no monitoring device or automatic level control, the interior of the unit must be inspected regularly to ensure proper levels of electrolyte are maintained. Opening the vessel to inspect it creates the possibility of contamination of the electrolyte. Moreover, opening the vessel exposes the user to hydrogen gas, which is dangerous. Third, if these levels are not maintained, the heat generated may be sufficient to melt or damage the plastic containment cylinder. Fourth, placing the electrodes at the side of the container can produce leaks as the electrolyte corrodes the connections. Finally, the gas accumulation zone at the top of the cylindrical chamber is large. It is possible to accumulate significant quantities of explosive hydrogen within this zone and then have this gas explode. The pop off top does little to prevent the explosion and may act as a missile once an explosion occurs.

BRIEF SUMMARY OF THE INVENTION

The instant invention overcomes all of these problems. It is an electrolysis unit that is sealed and has protection from explosions and corrosion. It has a plate structure that produces maximum efficiency of hydrogen production and can adjust the production to better match the needs of a given engine. Because the production level of hydrogen is high, and the time needed to produce sufficient quantities of hydrogen is low, there is no need to have a large accumulation chamber. A smaller accumulation chamber reduces the explosion hazard.

The unit has an automatic fill system to keep the electrolyte solution at the proper levels for efficient hydrogen production. As a result, the temperature of the electrolysis chamber remains low, thereby reducing the problems of cooling the chamber and the risk of melting the chamber, which can damage other components. The automatic fill system is also designed to prevent overfill of the electrolysis chamber if the vehicle is not level.

The device has an extraction chamber that is baffled to prevent back wash of electrolyte solution out of the electrolyte chamber.

The device has an explosion preventer that reduces the explosion risk by bubbling the produced gasses through a neutral fluid. The explosion threat is further reduced by using engine vacuum to pull the produced gasses out of the device quickly. Finally, conductive tape is placed over the device to shut down the electrical supply to the plates if the case does rupture. Cutting off the electrical supply not only causes gas production to stop, but prevents the possibility of sparks near the housing, thereby further reducing the explosion hazard.

It is an object of this invention to produce a hydrogen-oxygen fuel cell in which the production rate of hydrogen is high and the time needed to produce sufficient quantities of hydrogen is low, thereby reducing the size of an accumulation chamber for the hydrogen.

It is another object of this invention to produce a hydrogen-oxygen fuel cell that has an automatic fill system to keep the electrolyte solution at the proper levels for efficient hydrogen production.

It is a further object of this invention to produce a hydrogen-oxygen fuel cell that keeps the operating temperature of the electrolysis chamber low, thereby reducing the problems of cooling the electrolysis chamber and the risk of melting the electrolysis chamber.

It is another object of the invention to provide a hydrogen-oxygen fuel cell that delivers a constant level of hydrogen to a vehicle.

It is yet another object of the invention to provide a hydrogen-oxygen fuel cell that has a control to adjust the output of the fuel cell to produce an optimum amount of hydrogen for any size of engine.

It is yet a further object of this invention to produce a hydrogen-oxygen fuel cell in which the automatic fill system is also designed to prevent overfill of the electrolysis chamber if the vehicle is not level.

It is yet another object of this invention to produce a hydrogen-oxygen fuel cell that has an extraction chamber that is baffled to prevent back wash of electrolyte solution out of the electrolyte chamber.

It is another object of this invention to produce a hydrogen-oxygen fuel cell that has an explosion preventer that reduces the explosion risk by bubbling the produced gasses through a neutral fluid.

It is a further object of this invention to produce a hydrogen-oxygen fuel cell that uses conductive tape on the cover of the device to shut down the electrical supply to the device if the device suffers catastrophic failure.

DETAILED DESCRIPTION OF THE INVENTION

Figure 1:
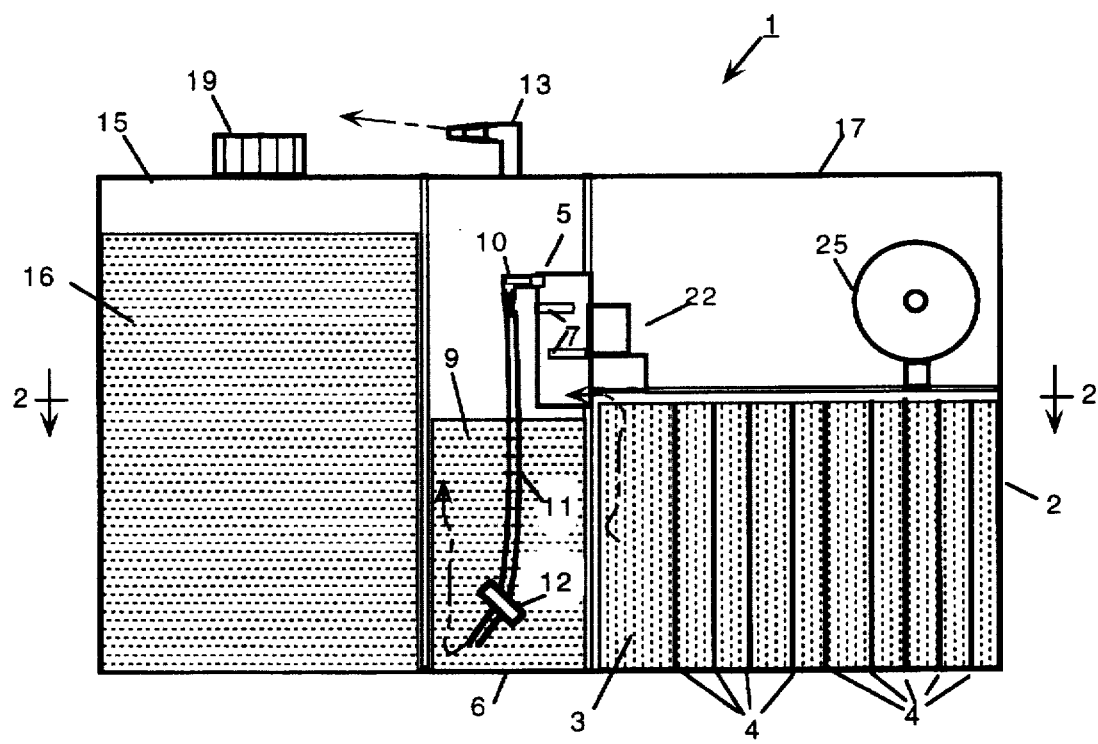
FIG. 1 is a side view of the invention.

Referring now to FIG. 1, the side view of the fuel cell 1 is shown. The fuel cell 1 has four main compartments. The first is the electrolysis chamber 2. This is the chamber that holds the electrolyte solution 3 and the stainless steel plates 4 that are used to produce the hydrogen and oxygen. The second compartment is the exhaust gas plenum 5 and the explosion preventer system (EPS) 6 (see also FIG. 4). This module has the exhaust plenum 5, which has two baffles 7 and a port 8. The EPS 6 is a compartment that is filled with a fluid 9. A nipple 10 transfers the gas from the plenum 5 to a hose 11 as shown. The hose 11 extends down to the bottom of the EPS chamber 6. At the end of the hose 11 is a one way check valve 12 that prevents back flow of gas or fluid 9 through the hose 11. At the top of the EPS 6 is an outlet port 13, through which the hydrogen and oxygen gasses are removed and passed into the engine as discussed below. The next compartment is the water tank 15. The water tank 15 is designed to hold replacement water 16 for the unit. This water 16 is automatically replaced from the water tank 15 to the electrolysis chamber 2 as needed. The operating system for this is discussed below. The fourth compartment is the control module 17, which is a sealed unit that houses all the controls. These controls are discussed in greater detail below.

Figure 2:
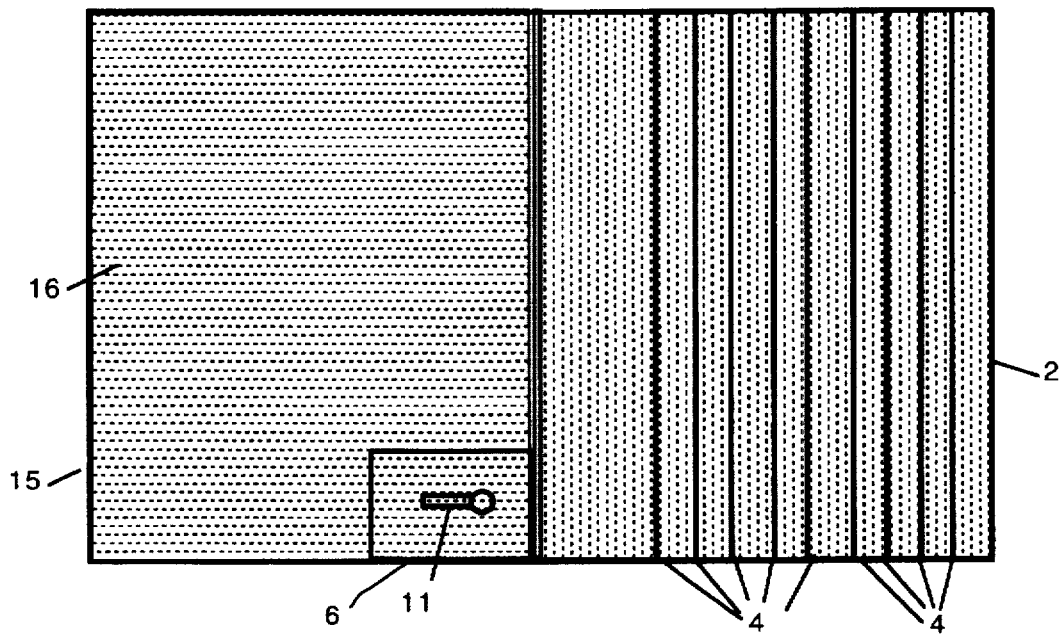
FIG. 2 is a top sectional view of the invention taken along the lines 2—2 of FIG. 1.

FIG. 2 is a top detail view of the lower housing, taken along the lines 2—2 of FIG. 1. This shows the placement of the EPS 6, the electrolysis chamber 2 and the water tank 15. All the compartments are sealed and made from a high strength molded plastic, in the preferred embodiment. Plastic is preferred so that a user can see the fluid levels easily and can refill the water tank 15 when needed, through the fill port 19 cap (see, e.g., FIG. 1).

Figure 9:
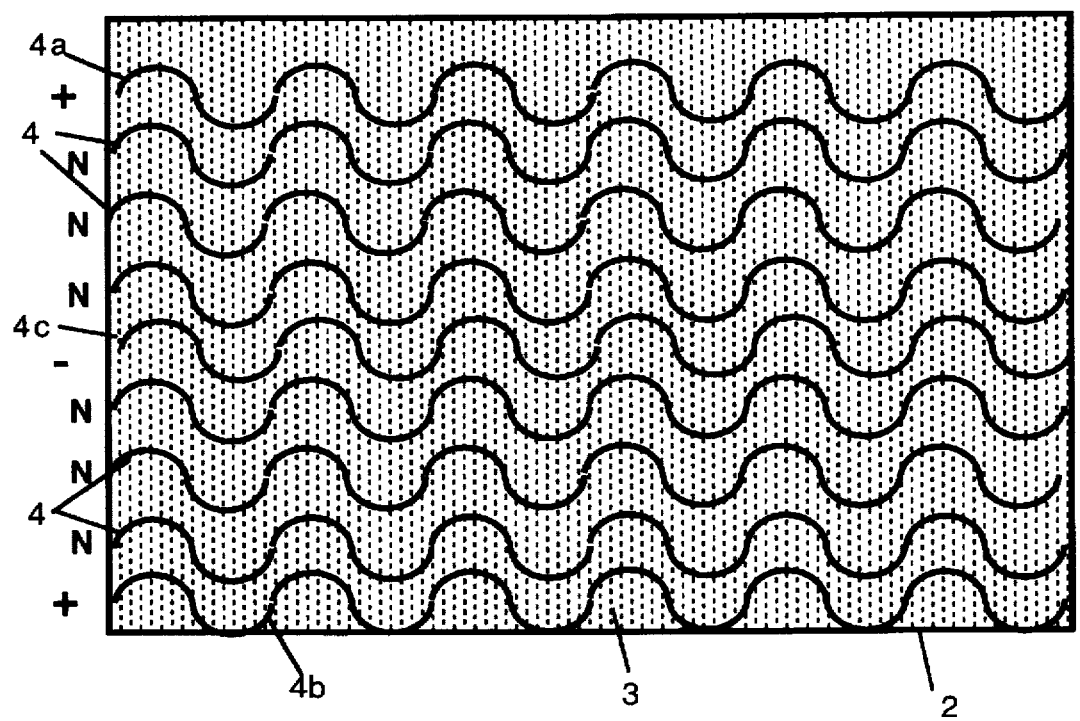
FIG. 9 is a top view of the preferred plate layout and structure.

FIG. 2 also shows the placement of the electrolysis plates 4. In this figure, the plates 4 are shown as being straight rectangles. Although this shape can be used, the corrugated shape of FIG. 9 is preferred, this preference is discussed below when the plate structure is discussed in detail.

Figure 3:
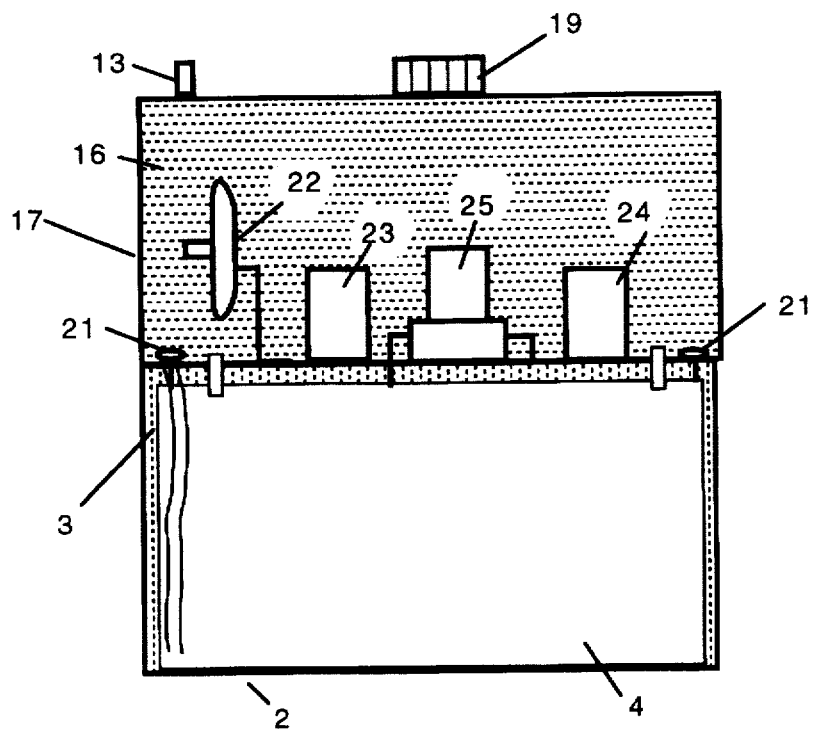
FIG. 3 is a right side elevation view of the invention.
Figure 4:
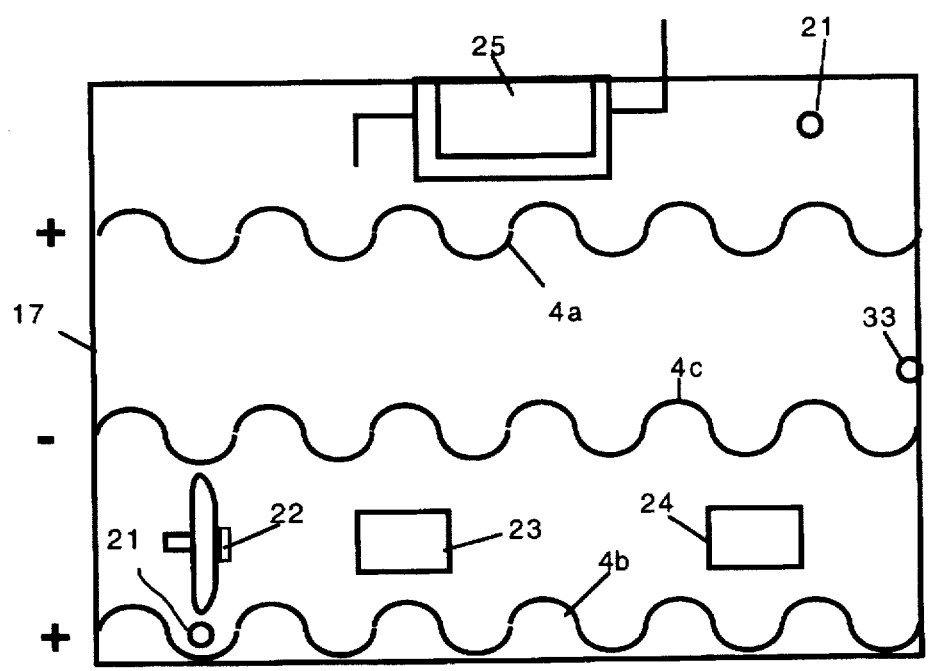
FIG. 4 is a partial top view of the invention showing the control module.

FIG. 3 is a right side view of the fuel cell 1. FIG. 4 is a top view of the control section, showing the main plates 4. The electrolyte level sensors 21, the vacuum switch 22, relay one 23, relay two 24 and the solenoid activated gate valve 25 are shown. FIG. 3 also shows the water tank fill cap 19.

As shown in FIG. 4, the plates 4 are corrugated. This permits a larger plate area to be housed in a smaller vessel. In the preferred embodiment, three charged plates 4a, 4b, and 4c are used along with six neutral plates N to form the plate grid (see FIG. 9). The number of plates 4 can be increased or decreased, but the efficiency of the device declines. If fewer plates 4 are used, the time needed to build production of the gasses increases. Moreover, the temperature of the device runs higher. If more plates than optimum are used, the spacing of the plates 4 may be too small. The small gap slows production because the released gas bubbles take longer to rise through a narrow chamber, thereby restricting the flow of electrolyte between the plates 4. This also decreases production. We have found a spacing of between about 0.375 and 0.5 inches between the plates 4 to be optimum. At this spacing, the escaping bubbles do not interfere with gas production. At the same time, the plates 4 are close enough together to maintain a high degree of gas production.

Figure 5:
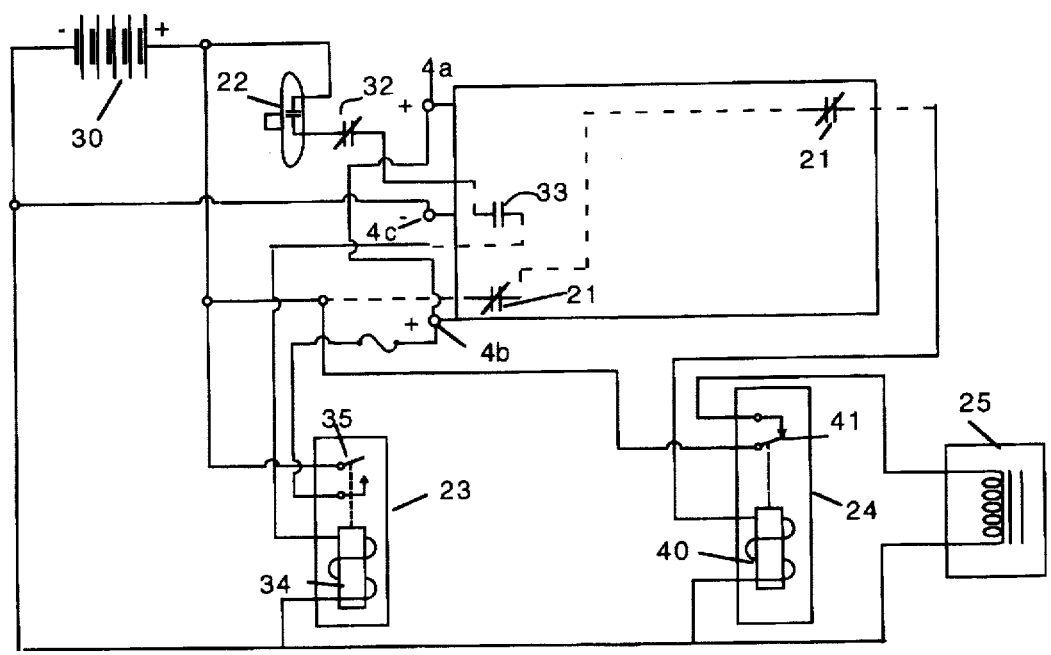
FIG. 5 is a schematic diagram of the operating circuits of the system in an "off" mode with the electrolyte chamber empty.
Figure 6:
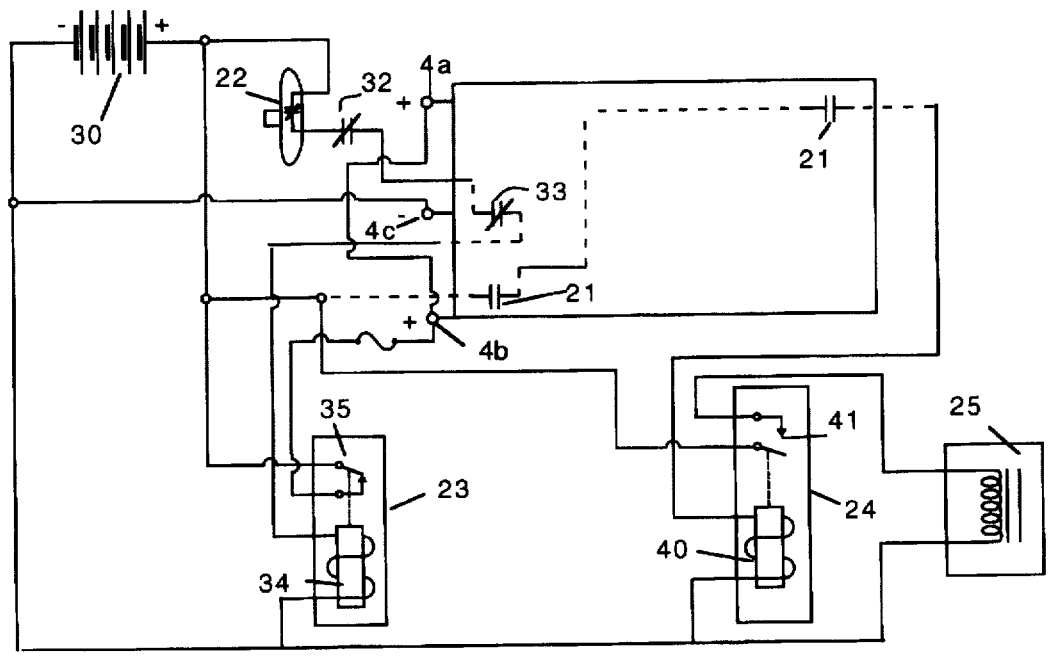
FIG. 6 is a schematic diagram of the operating circuits of the system in an "on" mode with the electrolyte chamber full.
Figure 7:
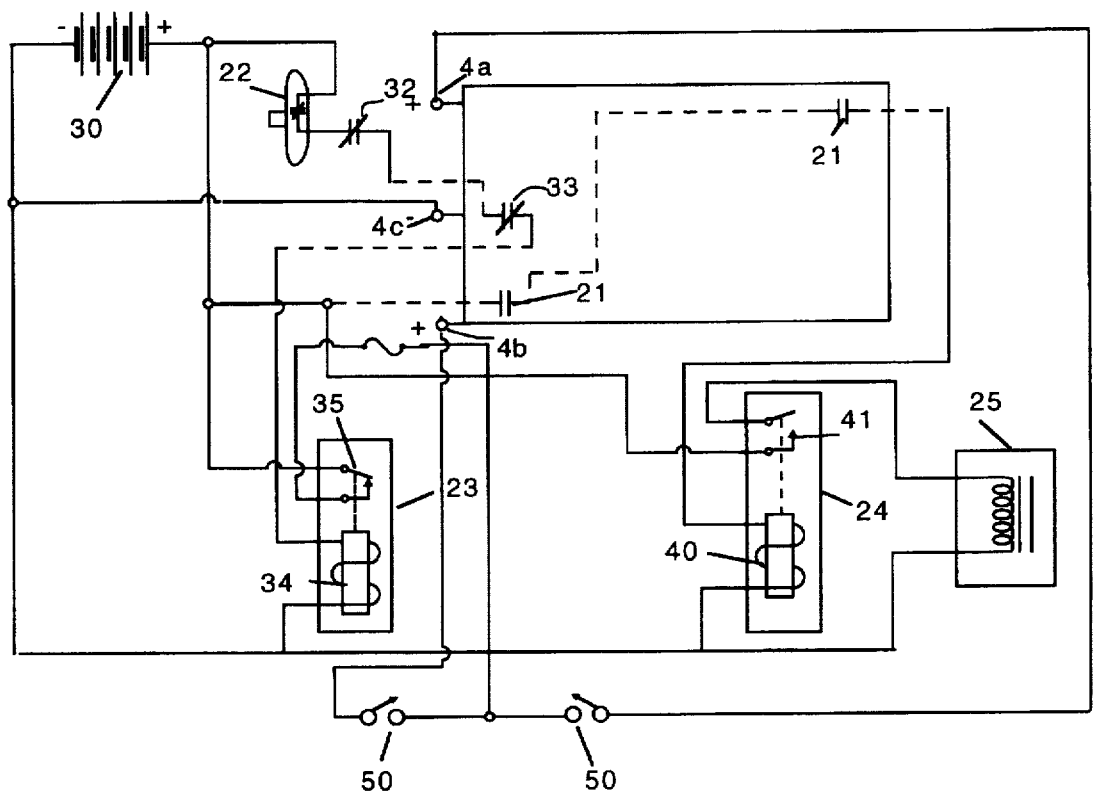
FIG. 7 is a schematic diagram of the operating circuits of the system showing an alternative power distribution scheme.

The controls consist of two main circuits. FIGS. 3 and 4 show the layout of the control elements. FIGS. 5, 6 and 7 show the electrical schematic diagrams of the circuits at two different states. Both circuits are operated from a battery power source 30. This can be a vehicle battery or an auxiliary battery as desired. FIG. 5 shows the system in the off mode. Of the two circuits, the first circuit is the gas production circuit. Power is fed from the positive terminal of the battery 30 to a vacuum switch 22. This switch is normally open and closes when engine vacuum is applied to the switch. In this way, the device does not produce gas if the engine is off and the ignition is accidentally left on. The power then flows through an emergency shut down circuit 32, which is discussed below. This circuit is normally closed. From there, the power feeds to a low fluid cutoff switch 33 that is normally open. From there, the power flows to the coil 34 of relay one 23. The other lead of the coil 34 feeds to the negative terminal of the battery 30. Relay one 23 is a normally open relay. When power is fed to the coil 34, the contacts 35 of relay one 23 close. That puts positive voltage from the battery 30 to the positive plates 4a and 4b a shown. The negative terminal of the battery 30 is directly connected to the center plate 4c. In the preferred embodiment, the charged plates 4a, 4b, and 4c are bolted to the floor of the control module 17.

The second circuit is the electrolyte level circuit. This circuit is designed to prevent the electrolyte level in the electrolyte chamber from dropping below the optimum level. If this occurs, the temperature of the device tends to rise and gas production drops. To prevent these conditions, circuit two provides a means of automatically maintaining water levels in the electrolyte chamber. In this circuit, positive battery 30 is connected to a number of level sensors 21 through the plates 4a and 4b. Because the sensors receive positive battery 30 from the plates 4a and 4b, the sensors are placed around the perimeter of the electrolyte chamber (see, e.g., FIG. 4) in alignment with the plates 4a and 4b. These sensors 21 are normally closed when the electrolyte chamber 3 is empty. When the electrolyte 3 level is at maximum, the level sensors 21 are open. The level sensors 21 are connected in series to the coil 40 of relay two 24. The other end of coil 40 goes to negative. The contacts 41 of relay two 40 are normally open. When coil 40 is energized, the contacts 41 close, thereby applying power to the solenoid activated gate valve 25, which opens. Because vacuum is being applied to the unit, water flows from the water tank 15 into the electrolyte chamber 2. When the electrolyte 3 level is again at its maximum, the level sensors 21 all open. That causes power to be cut to relay two, shutting the solenoid activated gate valve 25. Placement of the level sensors 21 allows the unit to be off level without causing the solenoid activated gate valve 25 to be open. If the device is off level, at least one of the level sensors 21 is covered with liquid. As long as one sensor remains covered with liquid, the solenoid activated gate valve 25 cannot be opened.

In one embodiment, the level sensors 21 are simple screws that are fastened to the top of the electrolyte chamber. The screws are in proximity to the plates 4a and 4b. Because of this proximity, the positive voltage from the plates is picked up by the screws when the electrolyte levels are low. As such, the screws are positively charged at low electrolyte levels, which causes the automatic fill circuit to become energized.

FIG. 6 shows the schematic of the device with all fluids at operating levels and the vehicle and fuel cell 1 in operation.

FIG. 7 shows an alternative wiring plan. In this system, two switches 50 are provided to separate power to the positive plates 4a and 4b. Using the switches 50, either positive plate or both positive plates may be energized. These switches 50 allow the fuel cell's 1 output to be adjusted as desired from ½ production to full production. In this way, the unit can be optimized for any size vehicle quickly and easily.

Figure 8:
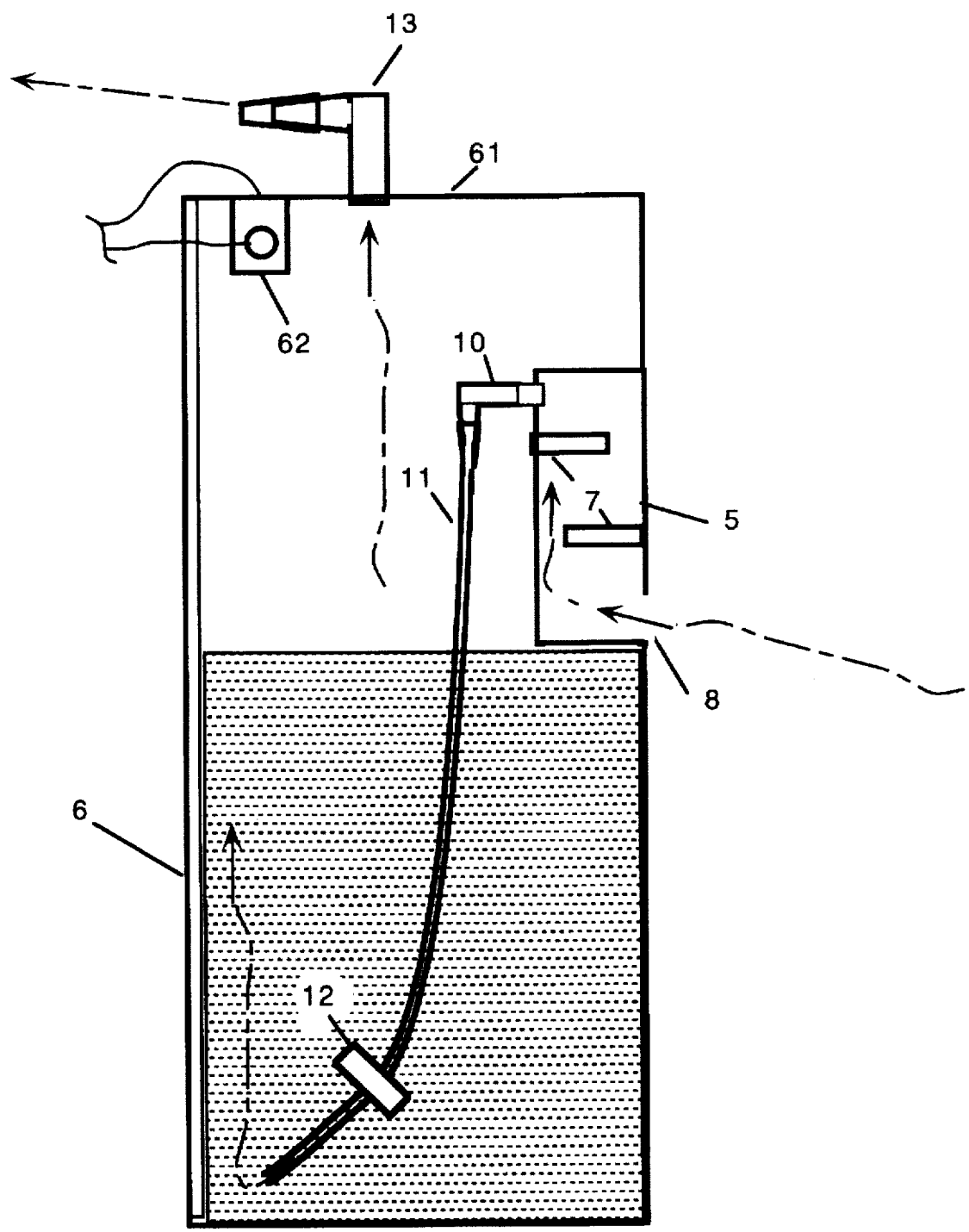
FIG. 8 is an enlarged side view of the gas removal path and explosion preventer system.

Referring now to FIG. 8, details of the gas discharge and EPS 6 are shown. As discussed above, the gas produced moves through the EPS 6 as shown. The top 61 of the EPS 6 is not sealed. It is placed so that ordinary pressures do not cause the top 61 to come off the unit. However, an explosive force blows the top 61 from the unit. As discussed above, an explosion power cutoff is provided. This can consist of a strip of metallic conduction tape 62 and leads 63, such as that used in burglar alarms. This tape is available from 3M Corporation of St. Paul, Minn. This tape acts as the normally closed contact 32 of FIGS. 5, 6 and 7. If the top 61 blows off, the tape 62 tears and opens the circuit to the electrolyte chamber 2, thereby shutting down gas production, preventing possible further explosions. An alternative to the tape is a wire 62 that is embedded in the plastic walls of the housing. Here, if the wire breaks, the circuit is shut down. Of course, any other breakable type contact device or system can be used to achieve the same purpose.

FIG. 9 shows the preferred arrangement of plates 4 within the electrolyte chamber 2. As discussed above, three charged plates 4a, 4b, and 4c are placed as shown. Six neutral plates 4 and labeled "N" are placed between the charged plates 4a, 4b, and 4c to maximize gas production.

There are a wide variety of solutions that can be used as electrolyte solution 3. Some examples of electrolyte solutions are: Potassium Hydroxide, Potassium Nitrate, Sodium Sulfate and Sulfuric Acid. Of these, Potassium Hydroxide is preferred. Sulfuric Acid produces the largest quantity of Hydrogen per unit volume, but is highly corrosive and quickly destroys the plate material. Potassium Hydroxide produces a good supply of hydrogen while not damaging the plates. The Potassium Hydroxide is mixed with water to form the electrolyte solution 3. Once in place, only additional water is needed to continue the hydrogen production. This water 16 is supplied from the water tank 15, as discussed above.

The device is used by filling the chambers with fluid, as appropriate, connecting the circuitry and starting the vehicle. Gas production begins and feeds into the engine from the exhaust port 13.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A hydrogen-oxygen fuel cell comprising:
   a) an electrolysis chamber, adopted to contain electrolyte, and having a perimeter;
   b) a plurality of plates, installed within said electrolysis chamber;
   c) a means for applying an electrical charge to said plurality of plates;
   d) means for sensing a level of electrolyte solution within said electrolysis chamber, wherein the means for sensing a level of electrolyte solution within said electrolysis chamber comprises a plurality of level sensors, spaced about the perimeter of the electrolysis chamber;
   e) a means for automatically refilling said electrolysis chamber with water;
   f) control means, operably connected to said means for sensing, to operate said means for automatically refilling; and
   g) a means for extracting hydrogen and oxygen produced in said electrolysis chamber.

2. The hydrogen-oxygen fuel cell of claim 1 further comprising a means for preventing a flash back explosion.

3. The hydrogen-oxygen fuel cell of claim 2 wherein said means for preventing a flash back explosion comprises:
   a) a flash back preventer chamber, said flash back chamber adopted to contain a quantity of liquid;

b) an inlet port, attached to said means for extracting hydrogen and oxygen, wherein said inlet port includes an extraction nipple that enters into said flash back preventer chamber;

c) a hose, fixedly attached to said extraction nipple, having a free end that extends downwardly therefrom into said flash back preventer chamber, wherein said hose is positioned such that when said quantity of liquid fills said flash back preventer chamber, said quantity of liquid reaches a level sufficient to cover the free end of said hose; and d) a check valve; operably attached to the free end of said hose to prevent a back flow of the quantity of liquid into the hose.

4. The hydrogen-oxygen fuel cell of claim 3 wherein the means for controlling an application of an electric charge to said plurality of plates includes an emergency cutoff switch.

5. The hydrogen-oxygen fuel cell of claim 4 wherein the emergency cutoff switch comprises a piece of electoconductive tape placed on the flash back preventer chamber, whereby if said back flash preventer chamber ruptures, said piece of electoconductive tape is torn, thereby breaking an electric circuit to said plurality of plates.

6. The hydrogen-oxygen fuel cell of claim 4 wherein the emergency cutoff switch comprises a piece of wire embedded in the flash back preventer chamber, whereby if said back flash preventer chamber ruptures, said piece of wire is broken, thereby breaking an electric circuit to said plurality of plates.

7. The hydrogen-oxygen fuel cell of claim 4 wherein the emergency cutoff switch further includes a low fluid level cutoff switch, said low fluid level cutoff having sensing means where by when said sensing means detects that the quantity of electrolyte solution in said electrolysis chamber has reached a low level, power is removed from said plurality plates, thereby shutting off the hydrogen-oxygen fuel cell.

8. The hydrogen-oxygen fuel cell of claim 1 further comprising a means for controlling an application of an electric charge to said plurality of plates.

9. The hydrogen-oxygen fuel cell of claim 8 wherein the means for controlling an application of an electric charge to said plurality of plates includes a vacuum operated switch.

10. The hydrogen-oxygen fuel cell of claim 1 wherein the means for applying an electrical charge to said plurality of plates comprises a battery.

11. The hydrogen-oxygen fuel cell of claim 1 wherein said plurality of plates are corrugated.

12. The hydrogen-oxygen fuel cell of claim 1 wherein said plurality of plates are arranged in a pattern comprising: a first outer plate, being positively charged; a second outer plate, being positively charged; a central plate, being negatively charged; at least one neutral plate, spaced between said first outer plate and said central plate; and at least one neutral plate, spaced between said second outer plate and said central plate.

13. The hydrogen-oxygen fuel cell of claim 12 further comprising a means for controlling an application of charge to said plurality of plates is selectable from the following configurations: said first outer plate is energized and said second outer plate is not energized; said first outer plate is not energized and said second outer plate is energized; and wherein both outer plates are energized.

14. The hydrogen-oxygen fuel cell of claim 1 wherein the means for automatically refilling said electrolysis chamber with water comprises:

a) a vessel, adopted to contain a quantity of water;

b) a means for transporting the quantity of water from said vessel to said electrolysis chamber;

c) a valve, operably placed within said means for transporting the quantity of water from said vessel to said electrolysis chamber, such that said valve operates to control a flow of said quantity of water; and d) a means for controlling said valve, in electrical communication with said valve and said plurality of level sensors.

15. The hydrogen-oxygen fuel cell of claim 1 wherein the control means to operate said means for automatically refilling includes a switchable relay.

16. The hydrogen-oxygen fuel cell of claim 1 wherein the means for extracting hydrogen and oxygen produced in said electrolysis chamber includes a baffled exhaust chamber.

17. A hydrogen-oxygen fuel cell comprising:

a) an electrolysis chamber, adopted to contain electrolyte, and having a perimeter;

b) a plurality of plates, installed within said electrolysis chamber;

c) a battery, in electrical communication with said plurality of plates, thereby imparting an electrical charge on said plurality of plates;

d) a plurality of level sensors, spaced about the perimeter of the electrolysis chamber;

e) a vessel, adopted to contain a quantity of water;

f) a means for transporting the quantity of water from said vessel to said electrolysis chamber;

g) a valve, operably placed within said means for transporting the quantity of water from said vessel to said electrolysis chamber, such that said valve operates to control the flow of said quantity of water;

h) a means for controlling said valve, in electrical communication with said valve and said plurality of level sensors;

i) a baffled exhaust chamber, in gaseous communication with said electrolysis chamber;

j) a flash back preventer chamber adopted to contain a quantity of liquid;

k) an inlet port attached to said means for extracting hydrogen and oxygen, wherein said inlet port includes an extraction nipple that enters into said flash back preventer chamber;

l) a hose, fixedly attached to said extraction nipple, having a free end that extends downwardly therefrom into said flash back preventer chamber, wherein said hose is positioned such that said quantity of liquid, fills said flash back preventer chamber, said quantity of liquid reaches a level sufficient to cover the free end of said hose; and m) a check valve; operably attached to the free end of said hose to prevent a back flow of the quantity of liquid into the hose.

18. The hydrogen-oxygen fuel cell of claim 17 further comprising an emergency cutoff switch.

19. The hydrogen-oxygen fuel cell of claim 18 wherein the emergency cutoff switch comprises a piece of electoconductive tape placed on the flash back preventer chamber, whereby if said flash back preventer chamber ruptures, said piece of electoconductive tape is torn, thereby breaking an electric circuit to said plurality of plates.

20. The hydrogen-oxygen fuel cell of claim 18 wherein the emergency cutoff switch comprises a piece of wire embedded in the flash back preventer chamber, whereby if said flash back preventer chamber ruptures, said piece of wire is broken, thereby breaking an electric circuit to said plurality of plates.

21. The hydrogen-oxygen fuel cell of claim 18 wherein the emergency cutoff switch further includes a low fluid level cutoff switch, said low fluid level cutoff having sensing means whereby when said sensing means detects that the quantity of electrolyte solution in said electrolysis chamber has reached a low level, power is removed from said plurality plates, thereby shutting off the hydrogen-oxygen fuel cell.

22. The hydrogen-oxygen fuel cell of claim 17 wherein said plurality of plates are corrugated.

23. The hydrogen-oxygen fuel cell of claim 17 wherein said plurality of plates are arranged in a pattern comprising: a first outer plate, being positively charged; a second outer plate, being positively charged; a central plate, being negatively charged; at least one neutral plate, spaced between said first outer plate and said central plate; and at least one neutral plate, spaced between said second outer plate and said central plate.

24. The hydrogen-oxygen fuel cell of claim 23 further comprising a means for controlling an application of charge to said plurality of plates is selectable from the following configurations: said first outer plate is energized and said second outer plate is not energized; said first outer plate is not energized and said second outer plate is energized; and wherein both outer plates are energized.

* * * * *